United States Patent [19]

Suzuki et al.

[11] 4,375,321
[45] Mar. 1, 1983

[54] EXPOSURE AMOUNT CONTROL DEVICE

[75] Inventors: Ryoichi Suzuki, Kawasaki; Ryuji Tokuda, Tokyo; Michio Hirohata, Inagi, all of Japan

[73] Assignee: Canon Kabushiki Kaisha, Tokyo, Japan

[21] Appl. No.: 231,044

[22] Filed: Feb. 4, 1981

[30] Foreign Application Priority Data

Feb. 8, 1980 [JP] Japan .................. 55-15092

[51] Int. Cl.³ ...................... G03B 7/083; G03B 7/093
[52] U.S. Cl. .................................. 354/23 D; 354/24; 354/49; 354/51
[58] Field of Search .................. 354/49–51, 354/59, 234, 235, 238, 42, 26–30, 246, 247, 230, 60 L, 24

[56] References Cited

U.S. PATENT DOCUMENTS

| | | | |
|---|---|---|---|
| 3,818,499 | 6/1974 | Brandt | 354/238 |
| 4,106,040 | 8/1978 | Ito et al. | 354/234 X |
| 4,192,589 | 3/1980 | Tokutomi | 354/60 L X |
| 4,258,990 | 3/1981 | Arisaka et al. | 354/29 |

*Primary Examiner*—William B. Perkey
*Attorney, Agent, or Firm*—Toren, McGeady and Stanger

[57] ABSTRACT

An exposure control device for use with a set of shutter blades which form a principal opening through which an exposure is made, includes a member which forms an auxiliary opening of a predetermined aperture before the shutter release starts. Upon release of the shutter, the auxiliary opening closes and thereafter opens fully in accordance with opening movement of the shutter blades so that the amount of light incident through the auxiliary opening is measured to control the exposure time through the principal opening. A time constant circuit which determines the time the shutter blades form the principal opening is arranged to start operation by detecting the variation of incident light measured through the auxiliary opening when the auxiliary opening has the predetermined aperture before shutter release, and when the auxiliary opening is brought into the closed state immediately after shutter release.

11 Claims, 4 Drawing Figures

EXPOSURE AMOUNT CONTROL DEVICE

FIELD OF THE INVENTION

The present invention relates to an exposure control device for controlling the amount of exposure provided by an electromagnetically driven shutter by measuring the amount of light incident through an auxiliary aperture. The device includes a time constant circuit for determining the shutter time of the electromagnetically driven shutter in response to the light incident through the auxiliary aperture.

DESCRIPTION OF THE PRIOR ART

It is well known that in an electromagnetically driven diaphragm shutter having shutter blades which also operate as a diaphragm, exposure cannot be controlled with high accuracy when incident light for controlling the amount of the exposure is measured by a light measuring system which is out of the exposure optical path. This is due to fluctuations in the opening movement in the shutter blades, or problems connected with γ transformation after the shutter blades have been totally opened. Consequently, a quasi-TTL actual aperture light measuring system recently has been widely used in electromagnetically driven shutters. This system measures the incident light by providing a light measuring element at an auxiliary opening or aperture, the area of which varies in proportion to that of the principal opening formed by the opening movement of the shutter blades.

When the amount of exposure is controlled by measuring the amount of incident light through the auxiliary opening, it is necessary to start the operation of a time constant circuit for determining the duration of opening of the shutter blades in response to the light incident upon a light measuring element at a time when the auxiliary opening is initially closed and before the principal opening has been formed. Up to now, switch contacts have been provided which are mechanically changed over with the operation of the shutter blades. Accordingly, reliable operation of the shutter blades is not certain because, for example, in an electromagnetically driven shutter in which the driving power of the shutter blades is small, power is consumed to some extent by the mechanical count start switch. In other words, the small driving power provided for the electromagnetically driven shutter is partly consumed by the mechanical switch, so that the power for driving the shutter blades is further weakened.

The above condition can be explained in detail as follows. Generally, the driving force F for an electromagnetically driven shutter is represented by $F=BIL$, wherein $B$=density of magnetic flux, $I$=current running through the magnetic field, and $L$=effective length of the coil arranged in the magnetic field.

When the shape and the weight of a camera are taken into consideration, a power source capable of supplying for, e.g., a 35 mm film camera is about $2\times3$ V batteries. The capacity of the power source is believed to be 1.5 V, 0.5 A when considering the effects of low temperatures. The length of the driving coil which has a resistance of 3 Ω ($=1.5$ V$\div 0.5$ A) is about 1-5 m and the diameter is 0.1 to 0.2 mm. Since it it impossible to arrange the whole coil in the magnetic field, about only one-half of the coil is so arranged. Further, under the handicap of limited space, it is very difficult to obtain a magnetic flux of more than 5000 gaus from the magnet which provides the magnetic field.

Under such circumstances, it is impossible electromagnetically to obtain 100 gr-200 gr of driving force to produce a 3 mm stroke which has been available from the conventional spring drive, but only, at most, 50 gr of driving force. Further, when the space, manufacturing cost, and weight attributable to the permanent magnet are considered, it is necessary to arrange the shutter blades for operation with 10 gr-20 gr driving power. If the count switch is mechanically operated by an electromagnetically driven shutter having such limited driving power, ten percent or more of the driving power is consumed for charging of the spring contact of the switch, so that the actual driving force available for the shutter blades is reduced all the more.

Further, conductivity of the switch contacts often cannot be established unless a sufficient pressure is applied to the contacts, so that as large a force as possible is necessary. Therefore, it is necessary to obtain large contact pressure and, at the same time, a large total driving force.

As mentioned above, it is very difficult to operate the mechanical start switch in this way so that when using the mechanical start switch, consideration should be given to allowing the switch contacts to serve also as a closing spring, or to operate the switch contacts instantaneously by way of a shock force to hold the start switch in a closed state.

An embodiment of an electromagnetically driven diaphragm shutter arranged to actuate a set of switch contacts by a shock force is shown in FIG. 1, and includes a shutter base plate 1 and shutter blades 2 which also operate as diaphragm or aperture blades. Three of the shutter blades 2 form a principal opening 4. An auxiliary shutter blade 3 is formed as a part of one of the shutter blades 2. Projections 5 on the shutter base plate 1 serve as pivots about which the shutter blades 2 rotate. A sector ring 6 is provided with a coil (not shown) on its surface so that when a current is supplied to the coil, the ring is rotated counterclockwise by the driving force (Lorenz force) produced in the magnetic field, thereby charging the closing spring 7. A stop 8 limits the rotation of the sector ring 6 by action of the spring 7. Three projections 6a are provided on the sector ring 6 to drive the shutter blades 2. An auxiliary aperture plate 9 is supported on the shutter base plate 1 by a shaft 10, the plate 9 having an auxiliary aperture opening 9a.

In the drawing, a standstill position is shown in which an under-exposure alarm window 9b is formed between a part of the opening 9a and an edge of the auxiliary aperture blade 3. The auxiliary aperture blade 3 also has a window opening 3a, wherein the auxiliary aperture area is formed in corresponding relationship with formation of the principal opening 4 by the shutter blades 2. The light incident through the auxiliary aperture is measured with a light sensing element (not shown) arranged behind the opening 9a of the auxiliary aperture plate 9.

A pressure or spring contact arm 11 forms one of the contacts of a start switch, and a projection 11a on the arm 11 is urged against a projection 6b on the sector ring so as to bring another arm projection 11b in contact with the other switch contact arm 13. An eccentric projection 12 is provided on the base plate 1 to allow the position of the pressure contact arm 11 to be adjusted finally and the driving force of the sector ring 6 to be transmitted by pushing against the pressure contact arm 11. The other switch contact arm 13 provides a weaker spring force than the pressure contact arm 11, and the timing for the start switch is adjusted by adjusting another eccentric projection 14 secured on the shutter base plate in contact with the switch contact arm 13.

The electromagnetic driven diaphragm shutter of FIG. 1 operates as follows:

When current is supplied to the coil (not shown) on the sector ring 6, the ring 6 is rotated in the counterclockwise direction so as to pivot the shutter blades 2 in the counterclockwise direction. The openings 9a and 9b of the auxiliary aperture are closed together with the auxiliary aperture blade 3 when the projection 6b on the sector ring 6 first strikes the projection 11a on the switch contact arm 11. Contact arm 11 then enters into contact with the contact arm 13 and conductivity thus is established so as to produce an impulse signal. This closes the start switch to start the operation of a time constant circuit (not shown) for controlling the amount of exposure.

Along with further rotation of the sector ring 6, incident light coming through an auxiliary opening formed between the aperture plate opening 9a and the window opening 3a is measured with the light sensing element (not shown). When the principal opening 4 starts to form so as to begin an exposure, a predetermined amount of the light incident upon the light sensing element is attained and the time constant circuit produces a predetermined output value. The exposure control device then produces a closing signal so as to interrupt the current supplied to the coil. As a result, the sector ring 6 is rotated in the clockwise direction by the action of the spring 7 so as to strike the projection 11a of the contact arm 11 and resume the start position, whereupon the principal opening 4 is also closed.

However, with the above-described construction, the resilient conductive member forming the switch contact arm 11 is easily deformed because of its small spring constant, so that it must be handled very delicately.

Further, as already mentioned, well over ten percent of the available shutter driving force is dissipated, so that fluctuation of the actual shutter driving force is considerable. Thus, the number of positions at which the shutter is adjusted, is increased, while costs for adjustment during manufacture are also increased. This is contrary to modern production methods, in which parts are standardized so as to meet series production requirements.

As mentioned above, the strength (several grams) and the position (contact timing) of the contact arms 11, 13 are to be adjusted at the same time. This is a very delicate task which increases the adjustment costs, while handling of the assembly after adjustment is also delicate. Further, when the start switch which signals the time at which the auxiliary aperture is closed is in the form of a mechanical switch, the position of the shutter blades is detected upon their transmitting of a switch contact closing force to the start switch. This introduces the danger of error due to mechanical play.

As explained above, in a shutter having a weak driving power or force, such as an electromagnetically driven diaphragm shutter, the mechanical start switch is difficult to arrange in view of the available driving force, while the switch itself presents many technical difficulties in its adjustment. The greatest problem, which is fluctuation of the timing information provided by the shutter, follows, in detail.

In an electromagnetically driven diaphragm shutter, aperture blades operate also as shutter blades, so that so-called programmed exposure control is used wherein the aperture value and the shutter time are both changed when the shutter opening time is selected and the brightness is high. Thus, a small variation of the shutter opening time yields a large influence on the amount of exposure. In this case, in order to obtain proper exposure, operation of the time constant circuit ideally is started from the moment at which the auxiliary aperture is first brought out of its initially open state (window 9b) into a fully closed state.

When the timing operation starts earlier than when the auxiliary aperture is fully closed, even if the film is not exposed, a prolonging capacitor (time constant circuit) is charged in response to the light coming through the auxiliary aperture in such a manner that the overall shutter time becomes short, so as to cause an under-exposure. In the contrary case, an over-exposure is caused. The larger the exposure error due to the difference between both timings, the higher the brightness, because the amount of light passing through the auxiliary aperture opening is larger and provides a larger influence upon the time interval during which current is supplied to the shutter driving coil. That is, the greater the brightness, the larger the influence upon the amount of light incident upon the film.

When using the mechanical start switch, the fluctuation in the start of the timing operation is large as discussed above, so that there is a great possibility that an error will occur in the amount of exposure.

SUMMARY OF THE INVENTION

In view of the above-mentioned situation, an object of the present invention is to offer an exposure amount control device having an auxiliary aperture, so designed that the auxiliary aperture which has been brought out of the pre-opened state into the closed state is electrically detected from the change of the output of the light sensing element so as to make the time constant circuit for controlling the exposure amount start the counting. Namely, the object is to offer an exposure amount control device not having a mechanical count start switch in such a manner that the exposure amount can be controlled surely even in case of for example, an electromagnetically driven shutter weak in the driving power.

Another object of the present invention is to offer an exposure amount control device so designed that when the incident light has a low brightness and the difference in the incident light amount upon the light sensing element between the case where the auxiliary aperture is opened and the case where the aperture is closed is so small so that it is difficult to detect the closing of the auxiliary aperture from the pre-opened state, the time constant circuit is made to start counting by the signal which is produced after the lapse of a certain determined time after the shutter release signal is produced.

DETAILED DESCRIPTION OF PREFERRED EMBODIMENTS

Below the present invention will be explained in detail in accordance with the accompanying drawings of the embodiments.

Figure 2:
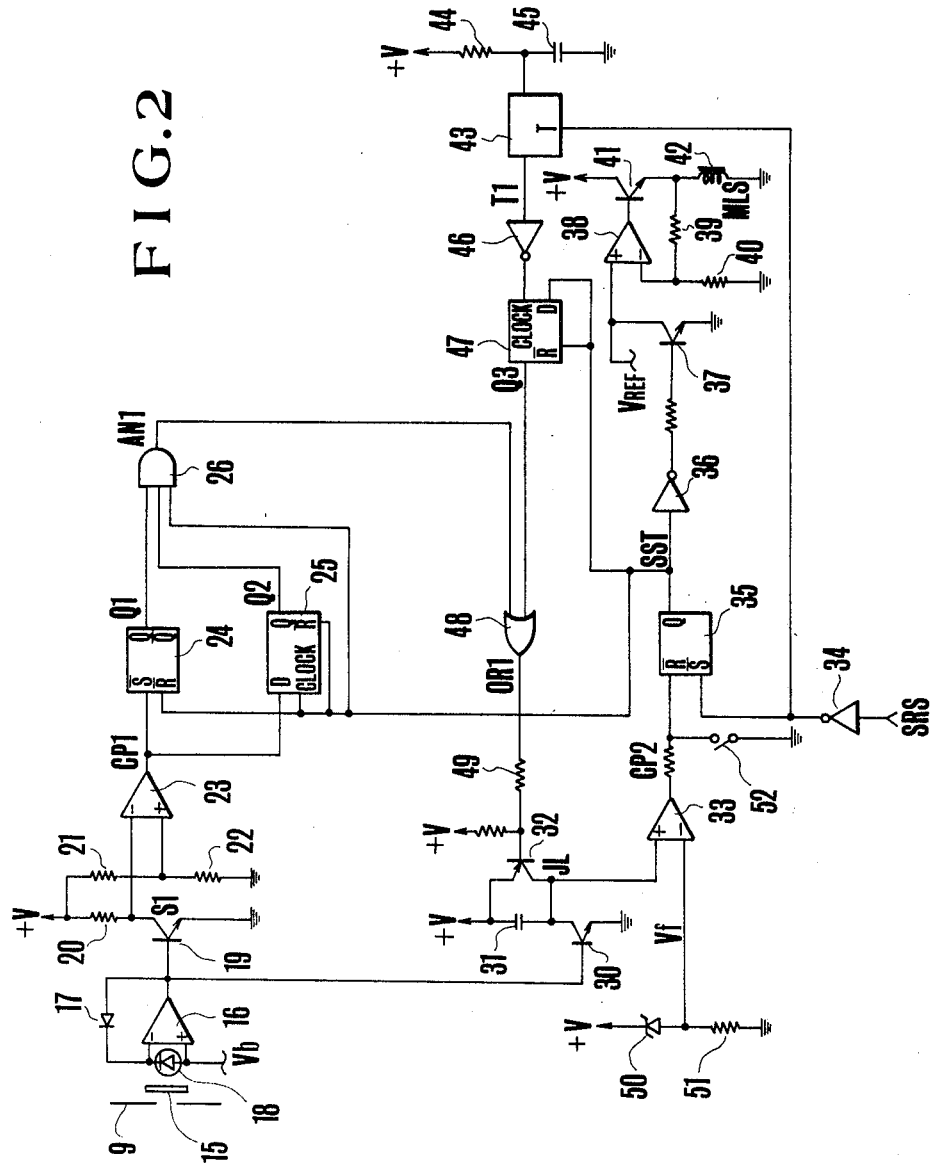
FIG. 2 shows an embodiment of the circuit of the exposure amount control device in accordance with the present invention.

The embodiment shown in FIG. 2 is basically constructed as mentioned below.

Figure 1:
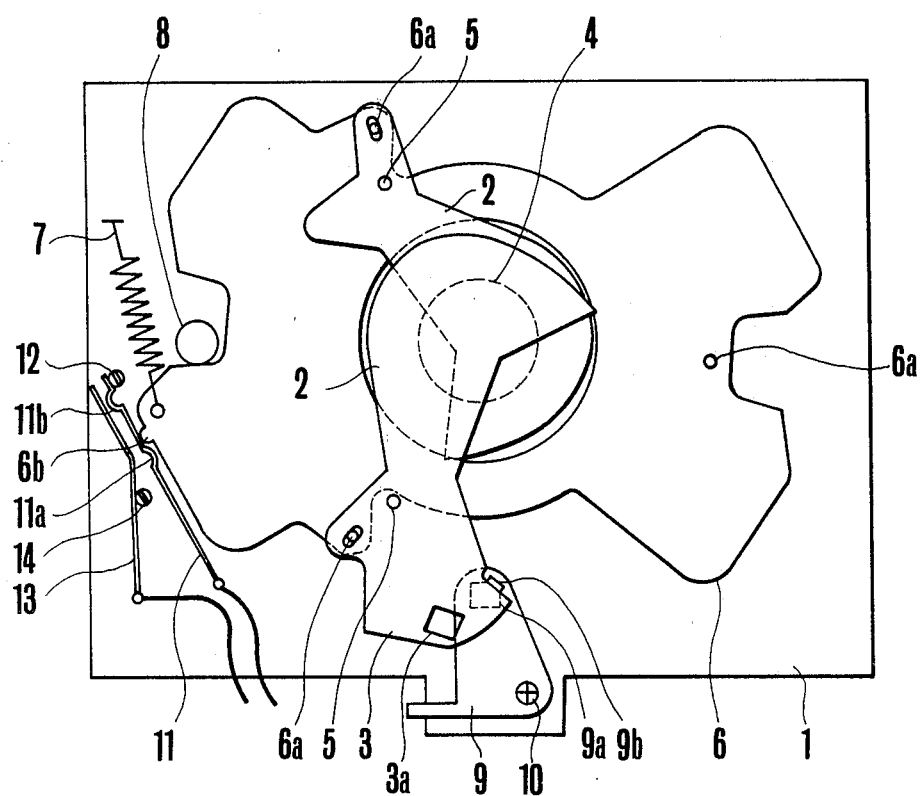
FIG. 1 shows an embodiment of the electromagnetically driven diaphragm shutter having a conventional mechanical count starting switch in plane view.

(1) The construction of electromagnetically driven diaphragm shutter is same as that shown in FIG. 1, whereby the switch parts (11-14) are omitted.

(2) In case of low brightness the light sensing element cannot detect the auxiliary aperture which has been closed out of the pre-opened state, whereby the light sensing element produces a signal that the auxiliary aperture has been closed even when the aperture is in pre-opened state. Consequently, as soon as the shutter start signal arrives, the time constant circuit of the shutter starts the counting. Under such circumstance the present embodiment is designed in such a manner that only when the light sensing element has detected that the auxiliary aperture is in the pre-opened state, the counting is started with the closing of the auxiliary aperture.

(3) When in case of (2), the brightness is so low that the light sensing element cannot detect the pre-opened state of the auxiliary aperture, a fixed timer which starts the counting after a certain determined time after the shutter start signal is produced.

(4) The time determining circuit is reset with the start of the shutter closing operation.

In FIG. 2, 9 is the auxiliary aperture, 15 is the ND filter for the film ASA sensitivity information input, 16 is the operational amplifier for constituting a silicone photocell (SPC) head amplifier, 17 is the logarithmically compressing diode inserted in the feed back circuit of 16, and 18 is a photoelectromotive SPC inserted between the input of 16. Further, to the non-inversing input of the operational amplifier 16 a bias DC voltage Vb is applied. 19 is the exponentially prolonging transistor, whose base is connected to the output of the above operational amplifier 16, and to whose collector the resistor 20 is connected. 21 and 22 are the voltage dividing resistors and 23 is the comparator, whose inversing input is connected to the collector of the above transistor 19 and whose non-inversing input is connected to the voltage dividing points of the resistors 21 and 22, 24 is the RS flip-flop circuit (hereinafter called RS-FF), whose set input is connected to the output CP1 of the above-mentioned comparator 23. 25 is the D flip-flop circuit (hereinafter called D-FF), whose D input is also connected to the output CP1 of the above-mentioned comparator 23. 26 is the AND gate of the three inputs, two inputs out of which are respectively connected to the output Q1 and Q2 of the above-mentioned flip-flop circuits 24 and 25. 30 is the exponentially prolonging transistor and 31 is the time determining condenser connected to the collector of 30. 32 is the count starting switching transistor connected in parallel to the time determining condenser 31, the base of which transistor is connected to the output OR1 of the OR gate 48 to be explained later via the resistor 49. 33 is the comparator, whose non-inversing input is connected to the collector JL of the above-mentioned transistor 30 and to whose inversing input the standard voltage Vf is applied. 50 is the constant voltage diode and 51 is a resistor, whereby the above-mentioned standard voltage Vf is produced at the connecting points of 50 and 51. 52 is the switch connected to the switch of the comparator 33, so designed as to be closed instantly in operative engagement of the release operation of the shutter button. 35 is the RS-FF, whose reset input is connected to the output CP2 of the above-mentioned comparator 33 and to whose set input the shutter release signal SRS is applied via the inversing circuit 34. The Q output of the RS-FF35 is connected to the reset input of the RS-FF24, the clock input and the reset input of the D-FF25, and the D input and the reset input of the D-FF47. 36 is the inversing circuit connected to the Q output of the above-mentioned RS-FF35 and 37 is the switching transistor, whose base is connected to the output of the above-mentioned inversing circuit 36 via a resistor. 38 is the operational amplifier constituting a part of the determining voltage circuit, to the non-inversing input of which amplifier the standard voltage $V_{REF}$ is applied and to the output of which amplifier the buffer transistor 41 is connected, to the emitter of which transistor the coil 42 of the electromagnetically driven shutter and the voltage dividing resistors 39 and 40 are connected in series, whereby the voltage dividing point of the resistors 39 and 40 is connected to the inversing input of the above-mentioned operational amplifier 38. 43 is the timer circuit, whose trigger terminal is connected to the output of the above-mentioned inversing circuit 34. 44 and 45 are the time determining resistor and the condenser of the timer circuit 43. 46 is the inversing circuit connected to the output T1 of the timer circuit 43, the output of which inversing circuit is connected to the clock terminal of the D-FF47. 48 is the 2 input OR gate, to whose inputs the output of the AND gate 26 and that of the D-FF47 are connected. Further, the one input of the AND gate 26 the output of the above-mentioned RS-FF35 is connected.

Figure 3:
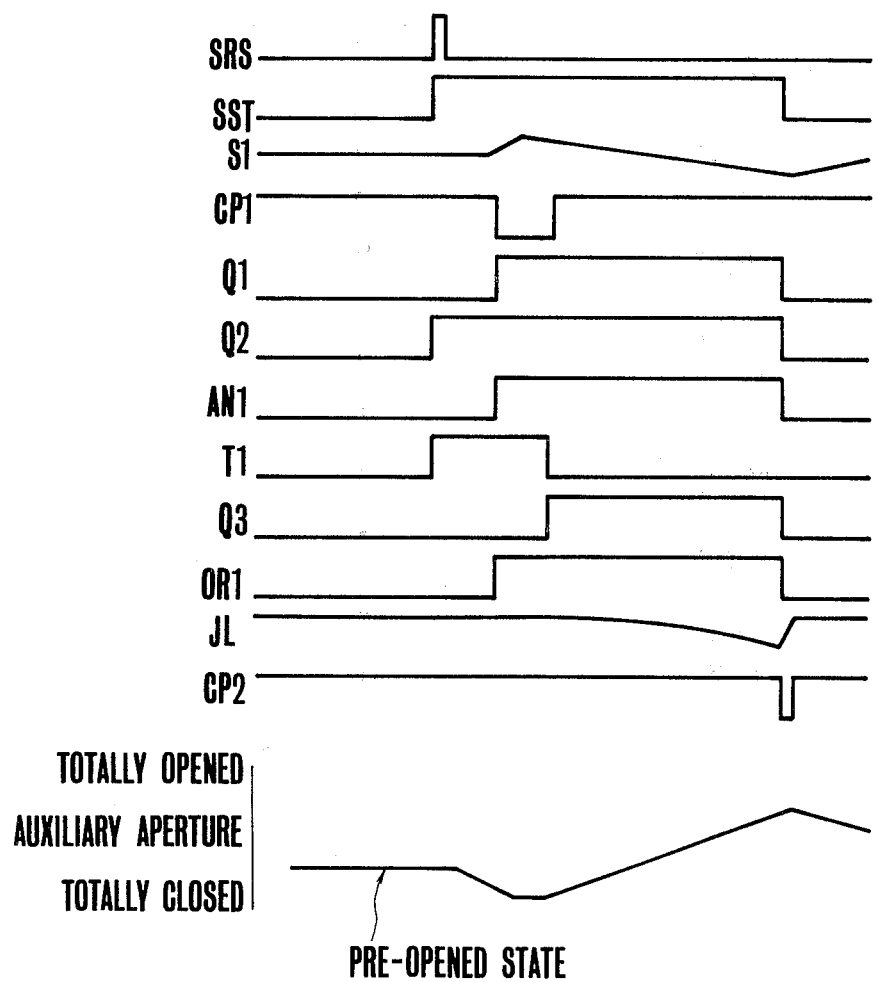
FIG. 3 shows the timing chart for explaining the operation of the circuit shown in FIG. 2 under the high brightness.

Below, the operation of the present circuit constructed as mentioned above will be explained in accordance with the timing chart shown in FIG. 3.

Because before the shutter operation there is some light incident upon the SPC18 through the pre-opened auxiliary aperture 9, at the output of the SPC head amplifier a voltage corresponding to the logarithmic value of the incident light amount is produced. The produced voltage is applied to the base of the prolonging transistor 19 of the next step in such a manner that an exponentially prolonged current runs through the collector, whereby the collector voltage S1 is lowered correspondingly than the source voltage +V. Now, let us suppose that the collector voltage is lower than that at the voltage dividing point of the resistors 21 and 22. Then, the level of the output CP1 of the comparator 23 is high. When the shutter release signal SRS is produced by means of the stroke of the shutter button not shown in the drawing or other signal, the inversed output is applied to the set input of the RS-FF35 so as to set the RS-FF35, the level of whose Q output is inversed high so as to produce the shutter start signal SST. (The switch 52 is closed by means of the shutter release operation, so that the RS-FF35 has been reset in advance.) Further, at the same time, the timer circuit 43 is triggered and the level of the output T1 is kept high during the time interval determined with the resistor 44 and the condenser 45. Further, when the level of the Q output of the above-mentioned RS-FF35 is inversed high and the shutter start signal SST is produced, the above-mentioned D-FF25 is set with the rising up of the SST because the level of the D input is high, whereby the level of the Q2 output is inversed high. Further, at the same time, with the growth of the SST signal the level of the output of the inversing circuit 36 is inversed low in such a manner that the switching transistor 37 is brought into the switched off state, the output of the operational amplifier 38 is increased so that the potential at the voltage dividing point of the resistors 39 and 40, whereby a current starts to be supplied with from the transistor 41 to the coil 42 provided on the sector ring 6 of the electromagnetically driven shutter in accordance with the output voltage. Hereby, the shutter blades 2 start the opening operation, in operative engagement with which operation the auxiliary aperture 15 starts to be brought out of the pre-opened state into the totally closed states. Along with this the amount of the light incident upon SPC18 is decreased so that the output voltage of the operational amplifier 16 is decreased, while the collector voltage S1 of the prolonging transistor 19 is increased. When the collector voltage S1 becomes higher than the voltage divided with the resistors 17 and 18, the level of the output CP1 of the comparator 23 is inversed low so as to set the RS-FF24, the level of whose output Q1 is inversed high. Because as mentioned above, the level of the Q output of the D-FF25 and that of the RS-FF35 are high, when the level of the output Q1 of the RS-FF24 becomes high the level of the output AN1 of the AND gate 26 also becomes high so that the level of the output OR1 of the OR gate 48 becomes also high so as to bring the switching transistor 32 for starting the counting into the switched off state.

When the shutter blades 2 move further, the auxiliary aperture 9 starts to gradually open out of the totally closed state, while the output voltage of the operational amplifier 16 goes up accordingly, whereby the exponentially prolonged current runs through the collector of the transistor 30 so as to charge the time determining condenser 31 because at this time the transistor 32 is in the switched off state. As soon as the charge level has reached a certain determined value, the collector voltage JL of the transistor 30 becomes lower than the inversed input level Vf of the comparator 33, the level of whose output CP2 is inversed low so as to reset the RS-FF35, the level of whose Q output is inversed low. Along with this inversion, the RS-FF24, the D-FF25 and 47 are reset, whereby their levels are inversed low.

Thus, the level of the output AN1 of the AND gate 26 becomes also low, while the level of the output OR1 of the OR gate 48 also becomes low. At this time, the switching transistor 32 for starting the counting is again brought into the switched on state so as to reset the time determining condenser 31. Further, when the level of the Q output of the above-mentioned RS-FF35 is inversed low that of the output of the inversing circuit 36 in the next step is inversed high, whereby the switching transistor 37 is brought into the switched on state and the level of the non-inversed input of the operational amplifier 38 drops down so that of the ground so as to interrupt the current supply to the coil 42 in such a manner that the shutter blades 2 start the closing operation. The above relates to the case that the object brightness is high so that the collector potential S1 of the transistor 19 is lower than the non-inversed input potential of the comparator 23 in the pre-opened state of the auxiliary aperture.

Figure 4:
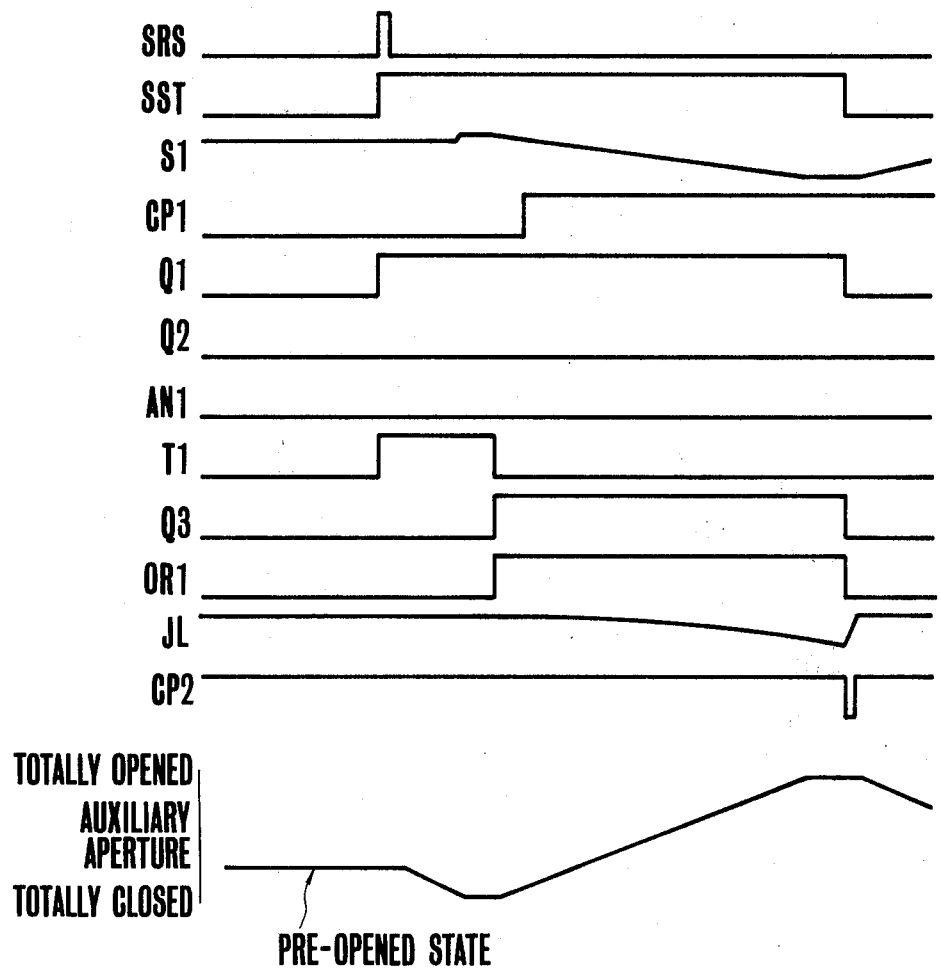
FIG. 4 shows the timing chart under the low brightness.

Below the case that the object brightness is so low that the collector potential S1 of the transistor 19 is somewhat higher than the non-inversed input level of the comparator 23 in the pre-opened state of the auxiliary aperture will be explained in accordance with the timing chart shown in FIG. 4. Because in this case the level of the output CP1 of the comparator 23 is low, even if the shutter start signal SST is produced the D-FF25 is not set, so that the level of its Q output Q2 remains low, while the level of the output of the AND gate 26 remains low, whereby no count starting signal is produced. In this case, the count starting signal is produced by means of the timer circuit 43 triggered with the shutter release signal. Namely, the shutter release signal SRS triggers the timer circuit 43, the level of whose output T1 is kept high for a certain determined time interval. When the level of the output T1 is inversed low after the lapse of the determined time interval, the level of the output of the inversing circuit 46 is inversed high. Because when the shutter release signal SRS is produced the shutter start signal SST is produced, whereby the level of the D-input of the D-FF47 is high, the D-FF47 is set when the level of the output of the inversing circuit 46 becomes high, whereby the level of the output Q3 is inversed high, the level of the output OR1 of the OR gate 48 is also inversed high, the switching transistor 32 for starting the counting is brought into the switched off state and the counting is started, namely the time determining condenser 31 starts to be charged. The operation after then is as mentioned above.

As is mentioned above, in case the object brightness is low the count starting switch is brought into the switched off state after the lapse of a certain time interval determined with the timer circuit 43 so that the fluctuation of the shutter operation cannot be compensated as mentioned above, whereby because the shutter time is long in case the object brightness is low, the exposure error due to the fluctuation is negligible and of no problem in practice. Further, the value of the resistors 21 and 22 can be chosen in such a manner that there takes place no problem. Further, the time interval during which the level of the output T1 of the timer circuit is kept high is set such that the auxiliary aperture is brought out of the pre-opened state into the totally closed state. Further, in the present embodiment the brightness information for starting the counting is detected from the collector potential S1 of the prolonging transistor 19 so that the detection can be made with higher sensitivity and accuracy in comparision with the case that the brightness information is detected from the output of the SPC head amplifier 16. Further, the collector current of the prolonging transistor 19 is temperature compensated by adjusting the (+) input bias voltage Vb of the SPC head amplifier 12 so that a stabilized detection independent of the temperature can be made.

Further, in the above-mentioned embodiment as the shutter the electromagnetically driven pre-opened shutter is used. However, the present invention is not limited to that shutter. The present invention is applicable to any light measuring system regardless of the type of shutter, so far as an auxiliary aperture assuming the pre-opened state is used.

As is explained so far in detail, in accordance with the present invention the light sensing element detects the auxiliary aperture which has been brought out of the pre-opened state into the closed state so as to produce a signal for starting the counting by means of the time determining circuit, so that even if there is a fluctuation of the operation of the shutter blades it is possible to make the above-mentioned time determining circuit start the counting without fail when the above-mentioned auxiliary aperture has been brought out of the pre-opened state into the totally closed state. Thus the fluctuation of the count start due to the fluctuation of the shutter blade operation can automatically be compensated. Further, all the inconvenience due to the arrangement of the mechanical count start switch can also be eliminated.

What is claimed is:

1. An exposure control device arranged so that an amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:

light measuring means for measuring the incident light through the auxiliary opening;

a time determining circuit responsive to an amount of light measured by the light measuring means for determining an exposure time and for producing as its output a closing signal to start a closing movement of the shutter blades;

timer means for starting an action when the opening movement of the shutter blades is started by the shutter release and for producing as its output a count start signal when a length of time necessary for the auxiliary opening to become fully closed from a pre-open state has ended; and switching means for starting operation of the time determining circuit in response to the count start signal.

2. An exposure control device in accordance with claim 3, wherein the timer means stops production of the count start signal when the closing signal is produced.

3. An exposure control device arranged so that an amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:

light measuring means for measuring the incident light through the auxiliary opening;

detecting means for detecting the open or the closed state of the auxiliary opening in response to the amount of light measured by the light measuring means;

a time determining circuit responsive to the amount of light measured by the light measuring means for determining an exposure time and for producing as its output a closing signal to start a closing movement of the shutter blades;

signal producing means for producing a count start signal when the detecting means detects the closed state of the auxiliary opening after the shutter release and for stopping the production of the count start signal when said closing signal is produced; and switching means for starting an operation of the time determining circuit in response to the count start signal.

4. An exposure control device arranged so that the amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:

light measuring means for measuring the incident light through the auxiliary opening and producing an output;

expanding means for expanding the output of the light measuring means;

detecting means for detecting the open and the closed state of the auxiliary opening in response to the output of the expanding means;

a time determining circuit responsive to the amount of light measured by the light measuring means to determine an exposure time;

signal producing means for producing a count start signal when the detecting means detects the closed state of the auxiliary opening after the shutter release;

switching means for starting operation of the time determining circuit in response to the count start signal;

said signal producing means including first signal forming means for providing a first operation signal in response to the shutter release;

second signal forming means for providing a second operation signal when the detecting means detects the closed state of the auxiliary opening;

gate means connected to the first and the second signal forming means for producing the count start signal in response to the first and the second operation signals;

a driving circuit for driving the shutter blades in response to the shutter release, and means for disabling the driving circuit in response to the output of the time determining circuit;

the first and the second signal forming means include flip-flops arranged to be reset when the driving circuit is disabled.

5. An exposure control device arranged so that the amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:

light measuring means for measuring the incident light through the auxiliary opening;

detecting means for detecting the open and the closed state of the auxiliary opening in response to the amount of light measured by the light measuring means;

a time determining circuit responsive to the amount of light measured by the light measuring means to determine an exposure time;

signal producing means for producing a first count start signal when the detecting means detects the closed state of the auxiliary opening after the shutter release;

timer means arranged to be triggered in response to the shutter release for producing a second count start signal after the lapse of a predetermined time from a movement when an opening movement of the shutter blades has been started; and switching means for starting the operation of the time determining circuit in response to one of the first and second count start signals.

6. An exposure control device in accordance with claim 5, further comprising:

a driving circuit for driving the shutter blades in response to the shutter release, and means for disabling the driving circuit in response to the time determining circuit.

7. An exposure control device arranged so that the amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:

light measuring means for measuring the incident light through the auxiliary opening and logarithmically compressing a value of light measured and producing the same as an output;

expanding means for logarithmically expanding the output of the light measuring means and generating an expanding current corresponding to the output of the light measuring means;

load means to which said expanding current is supplied, said load means varying a terminal voltage in correspondence with a variation of the expanding current;

detecting means for detecting the open and the closed state of the auxiliary opening in response to the terminal voltage;

a time determining circuit responsive to the amount of light measured by the light measuring means to determine an exposure time;

signal producing means for producing a count start signal when the detecting means detects the closed state of the auxiliary opening after the shutter release; and switching means for starting operation of the time determining circuit in response to the count start signal.

8. An exposure control device in accordance with claim 7, wherein said load means includes a resistor.

9. An exposure control device in accordance with claim 8, wherein the signal producing means includes:

first signal forming means for providing a first operation signal in response to the shutter release;

second signal forming means for providing a second operation signal when the detecting means detects the closed state of the auxiliary opening; and gate means connected to the first and the second signal forming means for producing the count start signal in response to the first and the second operation signals.

10. An exposure control device in accordance with claim 9, further comprising:

a driving circuit for driving the shutter blades in response to the shutter release, and means for disabling the driving circuit in response to the output of the time determining circuit.

11. An exposure control device in accordance with claim 10, wherein the first and the second signal forming means include flip-flops arranged to be reset when the driving circuit is disabled.

* * * * *

REEXAMINATION CERTIFICATE (920th)
United States Patent [19]
Suzuki et al.

[11] B1 4,375,321
[45] Certificate Issued Sep. 20, 1988

[54] EXPOSURE AMOUNT CONTROL DEVICE

[75] Inventors: Ryoichi Suzuki, Kawasaki; Ryuji Tokuda, Tokyo; Michio Hirohata, Inagi, all of Japan

[73] Assignee: Canon Kabushiki Kaisha, Tokyo, Japan

Reexamination Request:
No. 90/001,298, Jul. 31, 1987

Reexamination Certificate for:
Patent No.: 4,375,321
Issued: Mar. 1, 1983
Appl. No.: 231,044
Filed: Feb. 4, 1981

[30] Foreign Application Priority Data

Feb. 4, 1981 [JP] Japan ............................. 55-15092

[51] Int. Cl.$^4$ .................. G03B 7/083; G03B 7/097; G03B 7/099; G03B 7/093
[52] U.S. Cl. .................. 354/458; 354/427; 354/435; 354/483
[58] Field of Search .................. 354/427, 435–461, 354/234.1, 235.1, 230, 246, 247, 238.1, 258.1, 471, 473, 474, 475, 412, 483

[56] References Cited

U.S. PATENT DOCUMENTS

| | | | |
|---|---|---|---|
| 3,245,332 | 4/1966 | Kagan | 354/459 |
| 3,818,499 | 6/1974 | Brandt | 354/412 |
| 3,895,876 | 7/1975 | Mori | 354/427 X |
| 4,077,043 | 2/1978 | Nanba | 354/459 X |
| 4,106,040 | 8/1978 | Ito et al. | 354/234.1 |
| 4,174,893 | 11/1979 | Burgarella et al. | 354/436 |
| 4,192,589 | 3/1980 | Tokutomi | 354/471 |
| 4,258,990 | 3/1981 | Arisaka et al. | 354/436 |

*Primary Examiner*—William B. Perkey

[57] ABSTRACT

An exposure control device for use with a set of shutter blades which form a principal opening through which an exposure is made, includes a member which forms an auxiliary opening of a predetermined aperture before the shutter release starts. Upon release of the shutter, the auxiliary opening closes and thereafter opens fully in accordance with opening movement of the shutter blades so that the amount of light incident through the auxiliary opening is measured to control the exposure time through the principal opening. A time constant circuit which determines the time the shutter blades form the principal opening is arranged to start operation by detecting the variation of incident light measured through the auxiliary opening when the auxiliary opening has the predetermined aperture before shutter release, and when the auxiliary opening is brought into the closed state immediately after shutter release.

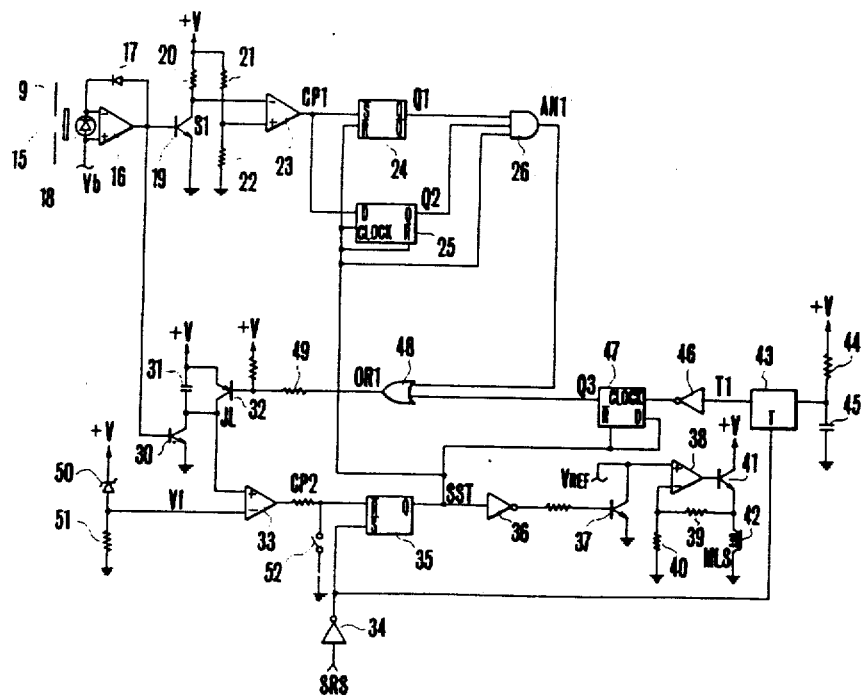

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4 and 9-11 is confirmed.

Claims 7 and 8 are cancelled.

Claims 1-3 and 5 are determined to be patentable as amended.

Claim 6, dependent on an amended claim, is determined to be patentable.

1. An exposure control device arranged so that an amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:
   light measuring means for measuring the incident light through the auxiliary opening;
   a time determining circuit responsive to an amount of light measured by the light measuring means for determining an exposure time and for producing as its output a closing signal to start a closing movement of the shutter blades;
   timer means for starting an action [when] *by means of a signal which makes* the opening movement of the shutter blades [is started by the shutter release] *start* and for producing as its output a count start signal when a length of time necessary for the auxiliary opening to become fully closed from a pre-open state has ended; and
   switching means for starting operation of the time determining circuit in response to the count start signal.

2. An exposure control device in accordance with claim [3] *1*, wherein the timer means stops production of the count start signal when the closing signal is produced.

3. An exposure control device arranged so that an amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:
   light measuring means for measuring the incident light through the auxiliary opening;
   detecting means for detecting the open or the closed state of the auxiliary opening in response to the amount of light measured by the light measuring means;
   a time determining circuit responsive to the amount of light measured by the light measuring means for determining an exposure time and for producing as its output a closing signal to start a closing movement of the shutter blades;
   signal producing means for producing a count start signal when the detecting means detects the closed state of the auxiliary opening after the shutter release [and for stopping the production of the count start signal when said closing signal is produced];
   *a holding circuit for holding the output of said signal producing means, a holding operation of said holding circuit being released by the closing signal;* and
   switching means for starting an operation of the time determining circuit in response to the count start signal.

5. An exposure control device arranged so that the amount of light incident through an auxiliary opening is measured to control exposure through a principal opening formed by a set of movable shutter blades, the auxiliary opening having a predetermined aperture before a shutter release and being arranged to open in corresponding relation with the opening movement of the shutter blades and after the auxiliary opening has fully closed, comprising:
   light measuring means for measuring the incident light through the auxiliary opening;
   detecting means for detecting the open and the closed state of the auxiliary opening in response to the amount of light measured by the light measuring means;
   a time determining circuit responsive to the amount of light measured by the light measuring means to determine an exposure time;
   signal producing means for producing a first count start signal when the detecting means detects the closed state of the auxiliary opening after the shutter release;
   timer means arranged to be triggered in response to the shutter release for producing a second count start signal after the lapse of a predetermined time from a movement when an opening movement of the shutter blades has been started, *said timer means operating in parallel with said signal producing means;* and
   switching means for starting the operation of the time determining circuit in response to one of the first and second count start signals.

* * * * *